Nov. 6, 1945.   C. W. HOLCOMB   2,388,324
MOTOR-OPERATED SHAVER
Filed July 7, 1944
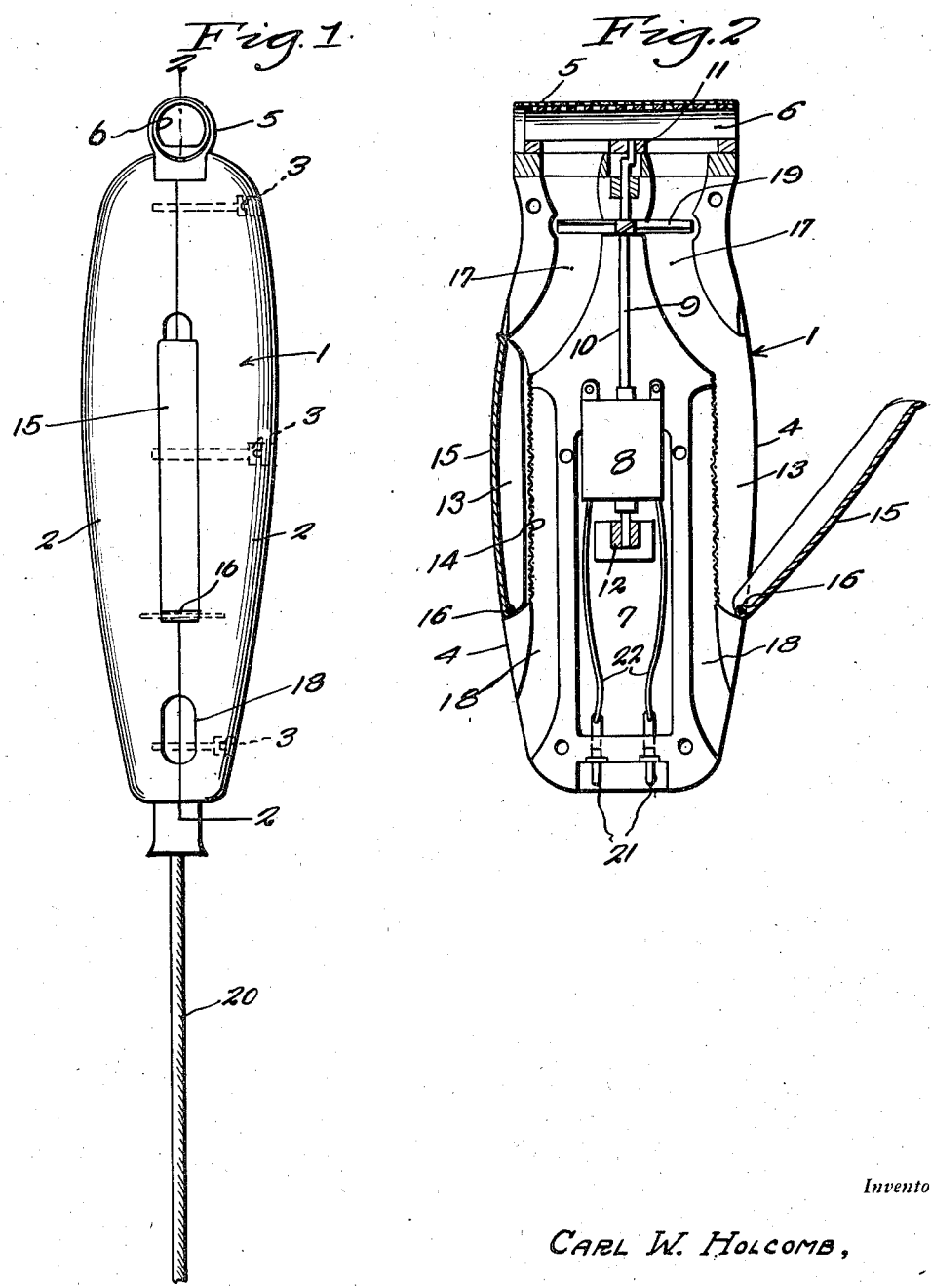
Inventor
CARL W. HOLCOMB,
By Clarence A. O'Brien
and Harvey B. Jacobson
Attorneys Patented Nov. 6, 1945

2,388,324

UNITED STATES PATENT OFFICE 2,388,324

MOTOR-OPERATED SHAVER

Carl W. Holcomb, Camp Davis, N. C.

Application July 7, 1944, Serial No. 543,909

2 Claims. (Cl. 30—41)

My invention relates to improvements in motor-operated shavers, of the so-called electric razor type, the primary object in view being to equip such shavers with means for disposing of hair clippings in a manner such that the clippings are accumulated in the casing of the shaver while said shaver is being used and until such time as it may be expedient to remove the same, whereby the usual objectionable depositing of hair clippings on the clothing, or person, is obviated and shaving thus rendered cleaner and more sanitary.

Another object is to equip such shavers for attaining the objectives above set forth without necessitating additional moving parts in the shaver, or in other ways increasing the cost of manufacture thereof.

Other and subordinate objects are also comprehended by my invention, all of which, together with the precise nature of my improvements, will be readily understood when the succeeding description and claims are read with reference to the drawing accompanying and forming part of this specification.

In said drawing:

Figure 1 is a view in side elevation of a motor-operated shaver equipped according to my invention, Figure 2 is a view in longitudinal section taken on the line 2—2 of Figure 1.

Referring to the drawing by numerals, my invention has been shown therein as embodied in a motor-operated shaver which, with the exceptions presently noted, is of a well known type comprising an elongated casing I formed of a pair of duplicate sections 2 mating flat in the median plane of the casing and secured together by screws 3, the sections 2 being shaped to impart to the casing I, rearwardly of the cutting end thereof, a generally oval form and bulging sides 4 providing for securing a firm hand grip on said casing. At the cutting end of the casing I is the usual hollow cutting head including a fixed cutting element 5 and a reciprocating cutting element 6 in the section 5 which is open at its inner side as is usual. The sections 2 are hollowed out to form, together, an elongated chamber 7 in the longitudinal center of the casing I rearwardly of the cutting end and containing a suitable fixed electric motor 8 the armature shaft 9 of which extends forwardly in the longitudinal center of said casing I, through a suitable channel 10 in the casing, with its front end operatively connected by a crank II thereon to the reciprocating cutting element 6, and its rear end journaled in a suitable bearing 12 in said chamber 7.

According to my invention, the casing I is provided with a pair of elongated recesses 13 in the opposite sides 4 thereof, of groove-like form and extending along said edges 4 with the ends thereof terminating short of the ends of the casing I. The grooves 13 are provided with bottoms 14 of reticulated material, such as fine screening. A pair of suitably curved and elongated cover plates 15 are hinged at one end to the casing I, as at 16, at the rear ends of the recesses 12 for closing flush with the sides 4 over said recesses, and which form, together with the recesses 13 and bottoms 14, storage chambers for hair clippings to be disposed of.

A pair of curved inlet ducts 17 are provided in the casing I upon opposite sides of its longitudinal center and which open at the cutting end of said casing into the reciprocating cutting section 6 and communicate at the rear ends thereof with the front ends of the recesses 13. Also, a pair of discharge conduits 18 are provided in the casing I upon opposite sides of the longitudinal center thereof which extend along the bottoms 14 behind the same and open at rear ends thereof onto the sides 4 of said casing in the rear of the recesses 13.

A suction fan 19 is fixed on the shaft 9 in the casing I adjacent the cutting end thereof and which extends into the inlet ducts 17.

The motor 8, as will be understood, is designed to be operated from the house circuit, or the like, by means of the usual plug-in line 20 for attachment to a pair of plug contacts 21 provided in the rear end of the casing I and wired to the motor 8, as represented at 22.

Referring now to the operation of the described invention, with the motor 8 operating, and when the shaver is in use, the fan 19 draws the clippings which pass into the reciprocating cutting section 6 from said section and blows the cuttings into the grooves 13, or, in other words, the described storage chambers, the air passing into said grooves 13 with the clippings escaping through the bottoms 14 of said grooves and into the discharge ducts 18 to be forced out of said ducts. The clippings accumulated may be disposed of at any time by opening the cover plates 15 and emptying the grooves 13 or storage chambers. The fan 19, in addition to functioning as described, also serves to cool the cutting head as will be clear.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In a shaver of the class described, an elongated flat casing forming a handle, a hollow cutting head at one end of the casing including a reciprocating cutting element, a pair of grooves extending along opposite side edges of said casing, with bottoms of reticulated material and forming storage chambers for cuttings, inlet means in the casing establishing communication between said head and chambers, a pair of discharge ducts in the casing extending along said bottoms behind said grooves and to the other end of the casing a motor-driven suction fan in said casing operative to create a forced draft through said head and means and said chambers and hinged covers for said grooves.

2. In a shaver of the class described, an elongated flat casing forming a handle, a hollow cutting head at one end of the casing including a reciprocating cutting element, a pair of grooves extending along opposite side edges of said casing, with bottoms of reticulated material and forming storage chambers for cuttings, inlet means in the casing establishing communication between said head and one end of said grooves, a pair of discharge ducts in the casing extending along said bottoms behind said grooves to the other end of the casing, and a motor-driven suction fan in said casing operative to create a forward draft through said head and means and said chambers, said means comprising a pair of ducts into both of which said fan extends.

CARL W. HOLCOMB.